United States Patent [19]
Relph

[11] Patent Number: 6,097,751
[45] Date of Patent: Aug. 1, 2000

[54] METHOD OF, AND APPARATUS FOR, PROCESSING LOW POWER PSEUDO-RANDOM CODE SEQUENCE SIGNALS

[75] Inventor: Peter M. Relph, Roydon, United Kingdom

[73] Assignee: U.S. Philips Corporation, New York, N.Y.

[21] Appl. No.: 09/005,624

[22] Filed: Jan. 9, 1998

[30] Foreign Application Priority Data

Jan. 15, 1997 [GB] United Kingdom .................. 9700776

[51] Int. Cl.[7] .............................. A61F 2/06; H04L 27/30
[52] U.S. Cl. ........................ 375/130; 455/524; 370/312
[58] Field of Search ................................ 375/200, 201, 375/202, 206, 208, 130, 132, 134, 136, 137, 140, 141, 147; 370/312, 342, 343, 344, 479; 455/39, 517, 524

[56] References Cited

U.S. PATENT DOCUMENTS

| 5,430,759 | 7/1995 | Yokev et al. ......................... 375/202 |
| 5,469,468 | 11/1995 | Schilling .............................. 375/200 |
| 5,808,582 | 9/1998 | Woo ..................................... 342/357 |
| 5,872,522 | 2/1999 | Gibson ............................. 340/825.44 |
| 5,872,814 | 2/1999 | McKeekin ............................ 375/296 |
| 5,881,092 | 3/1999 | Gibson ................................. 375/200 |
| 5,937,000 | 8/1999 | Lee et al. ............................. 375/200 |
| 5,940,429 | 8/1999 | Lam et al. ........................... 375/200 |
| 5,960,047 | 9/1999 | Proctor, Jr. et al. ................. 375/347 |
| 5,963,582 | 10/1999 | Stansell, Jr. ......................... 375/200 |

FOREIGN PATENT DOCUMENTS

WO9614716 5/1996 WIPO ............................. H04Q 7/10

*Primary Examiner*—Chi H. Pham
*Assistant Examiner*—Bryan Webster
*Attorney, Agent, or Firm*—Jack D. Slobod

[57] ABSTRACT

A communications system includes a primary station having transmitting and receiving sections, a formatting stage for formatting messages to be transmitted by the transmitting section, and one or more secondary stations. The or each secondary station has a receiving section for receiving messages from the primary station and a transmitting section for transmitting signals as pseudo-random code sequence signals, and the primary station is adapted to receive and to simultaneously decode and detect the or each of the pseudo-random code sequence signals. The simultaneously decoding and detection operations involves implementation of a Fast Fourier Transform (FFT) in a manner that a code sequence for despreading the pseudo-random code sequence is applied within the FFT. A resulting spectrum is checked for a peak which indicates that one of the pseudo-random code sequences has been successfully decoded and detected.

11 Claims, 3 Drawing Sheets

METHOD OF, AND APPARATUS FOR, PROCESSING LOW POWER PSEUDO-RANDOM CODE SEQUENCE SIGNALS

BACKGROUND OF THE INVENTION

1. Field of the Invention

The present invention relates to a method of, and apparatus for, processing low power pseudo-random code sequence signals or pseudo-random data sequences and has particular, but not exclusive, application to telecommunications systems such as cellular telephone systems, hand held digital signal processing apparatus and digital paging systems having an answer back capability.

2. Description of the Related Art

An advantage of transmitting signals as spread spectrum signals or pseudo-random code sequences is that several signals can be transmitted contemporaneously on a single carrier frequency and each of the signals can be recovered by techniques, such as correlation, which involves comparing or multiplying each member of a set of code sequences with the received signals and by a process of trial and error to despread each of the signals which is detected using techniques such as Fourier Analysis.

A particular, but not exclusive, application of the present invention is answer back message paging systems, for example of a type disclosed in PCT Patent Specification WO96/14716, corresponding to U.S. Pat. No. 5,872,522 which is owned in common with the present application, in which primary stations transmit messages to secondary stations which transmit registration requests and/or simple replies to the messages as pseudo-random code sequences. At the primary station, the received spread spectrum signals having strengths lying within an acceptable tolerance range can be processed as a group. The processing requires despreading the signals by matching a respective code sequence from a large set of code sequences with the received signals and detecting the registration and/or reply signal for example by determining the choice of code sequence used or applying Fourier Transform techniques. Processing signals in two stages is computationally intensive. The number of Fourier Transforms to be done limits the system capacity. In order to process say 1000 pseudo random code sequences this will either mean that there is a time penalty which limits the capacity of a system or require more processor power if the time penalty is to be reduced. A system operator is in consequence faced with higher operating costs due to the relatively long time spent in processing each pseudo random code sequence or additional installation and operating costs associated with a more powerful processor in order to process the pseudo-random code sequences quicker.

OBJECT AND SUMMARY OF THE INVENTION

An object of the present invention is to facilitate processing of simultaneously received pseudo-random code sequence signals in a more effective manner.

According to a first aspect of the present invention there is provided a communications system comprising a primary station having transmitting and receiving means, means for formatting messages to be transmitted by the transmitting means, and one or more secondary stations, the or each secondary station having receiving means for receiving messages from the primary station and means for transmitting signals as pseudo-random code sequences, said receiving means in the primary station being adapted to receive and to simultaneously decode and detect each of the received pseudo-random code sequences.

According to a second aspect of the present invention there is provided a primary station for use in a communications system comprising at least said primary station and at least one secondary station having means for transmitting signals as pseudo-random code sequences, the primary station comprising transmitting and receiving means, means for formatting messages to be transmitted by the transmitting means, said receiving means being adapted to receive and to simultaneously decode and detect the or each of a plurality of received pseudo-random code sequences.

According to a third aspect of the present invention there is provided a method of distinguishing between each of a plurality of substantially simultaneously occurring different pseudo-random code sequence signals, comprising simultaneously despreading and detecting the received pseudo-random code sequences.

This invention is based on the realisation that the total amount of processing of the received pseudo-random code sequences can be reduced if when doing the Fast Fourier Transforms (FFT) the constants used in the multiplications take into account the need to despread.

Computer simulation of simultaneously decoding and detecting pseudo-random code sequence signals has demonstrated that processing such signals in this way requires 20% less computing effort which means that at least 10% more signals can be processed for the equivalent investment in computing equipment which is of significant benefit to a system operator.

When transmitting the long data messages to various addressees, these are known to the system controller which can compute the constants using the pseudo-random code sequences which have been allocated to the addressees for their replies. If the nature of the reply can be anticipated, for example YES or NO, then the amount of computation can be reduced further as fewer constants will have to be calculated.

In the reply phase, these constants are used in the "butterflies" to despread and FFT.

In an embodiment of the present invention a digitised version of the received signal is simultaneously despread and detected by using a combination of a despread code and precalculated constants.

BRIEF DESCRIPTION OF THE DRAWINGS

The present invention will now be described, by way of example, with reference to the accompanying drawings, wherein.

In the drawings the same reference numerals have been used to indicate corresponding features.

DETAILED DESCRIPTION OF THE PREFERRED EMBODIMENTS

Figure 1:
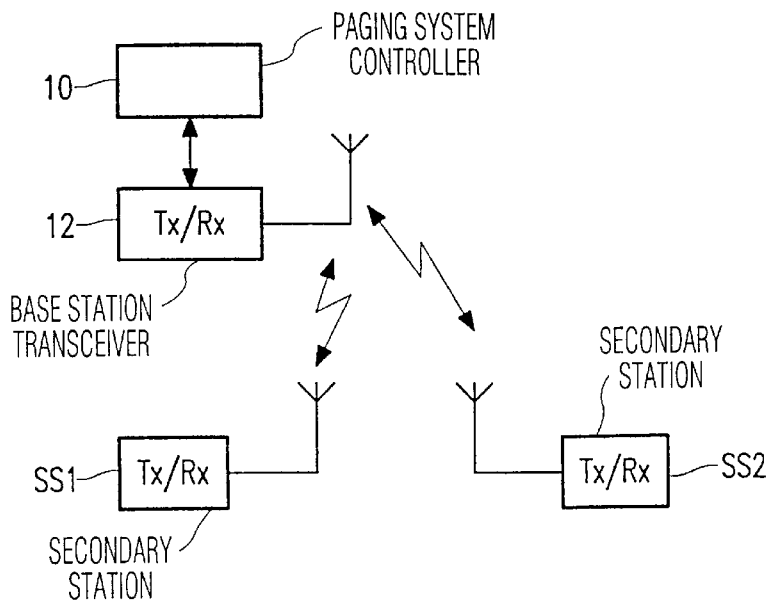
FIG. 1 is a diagram illustrating a message transmission system for transmitting data messages.

The system shown in FIG. 1 may comprise a system for transmitting relatively long data messages, such as telescript or e-mail, or a paging system. For convenience of description the present invention will be described with reference to a high rate paging system operating in accordance with a protocol known by the Applicant as the Advanced Paging Operators Code (APOC), which has provision for sending address code words and concatenated message code words in cycles having a duration of 6.8 secs. Each cycle comprises a plurality of batches, for example 3 batches of equal duration. Each batch comprises a synchronisation (sync) code word concatenated with n frames, each of which is constituted by m code words.

The paging system comprises a paging system controller 10 which is connected to at least one base station transceiver 12, if necessary by land lines or other suitable links. In the event of there being more than one base station transceiver they may be geographically spaced apart and may operate in a quasi-synchronous mode.

Selective call receivers or secondary stations SS1, SS2 are provided, each of which comprises a transceiver which is able to receive transmissions from the transceiver 12 and is able to transmit a limited number of types of messages, including acknowledgements, at significantly lower powers than the output power of the transceiver 12, for example 30 dB lower. The messages are transmitted as spread spectrum signals, more particularly as pseudo-random code sequences, typically at an information rate of one thousandth of that transmitted by the transceiver 12 and a code sequence length of the order of $10^4$, for example 8191 chips per bit.

The transmissions by the selective call receivers or secondary stations SS1, SS2 is done in response to invitation signals transmitted by the paging system controller 10. In one embodiment the intelligibly received responses to a first invitation signal are acknowledged in a second, repeat invitation signal so that those secondary stations SS1, SS2 not receiving an acknowledgement can resend their responses whereas those receiving an acknowledgement know that their transmission was processed by the paging system controller.

Figure 2:
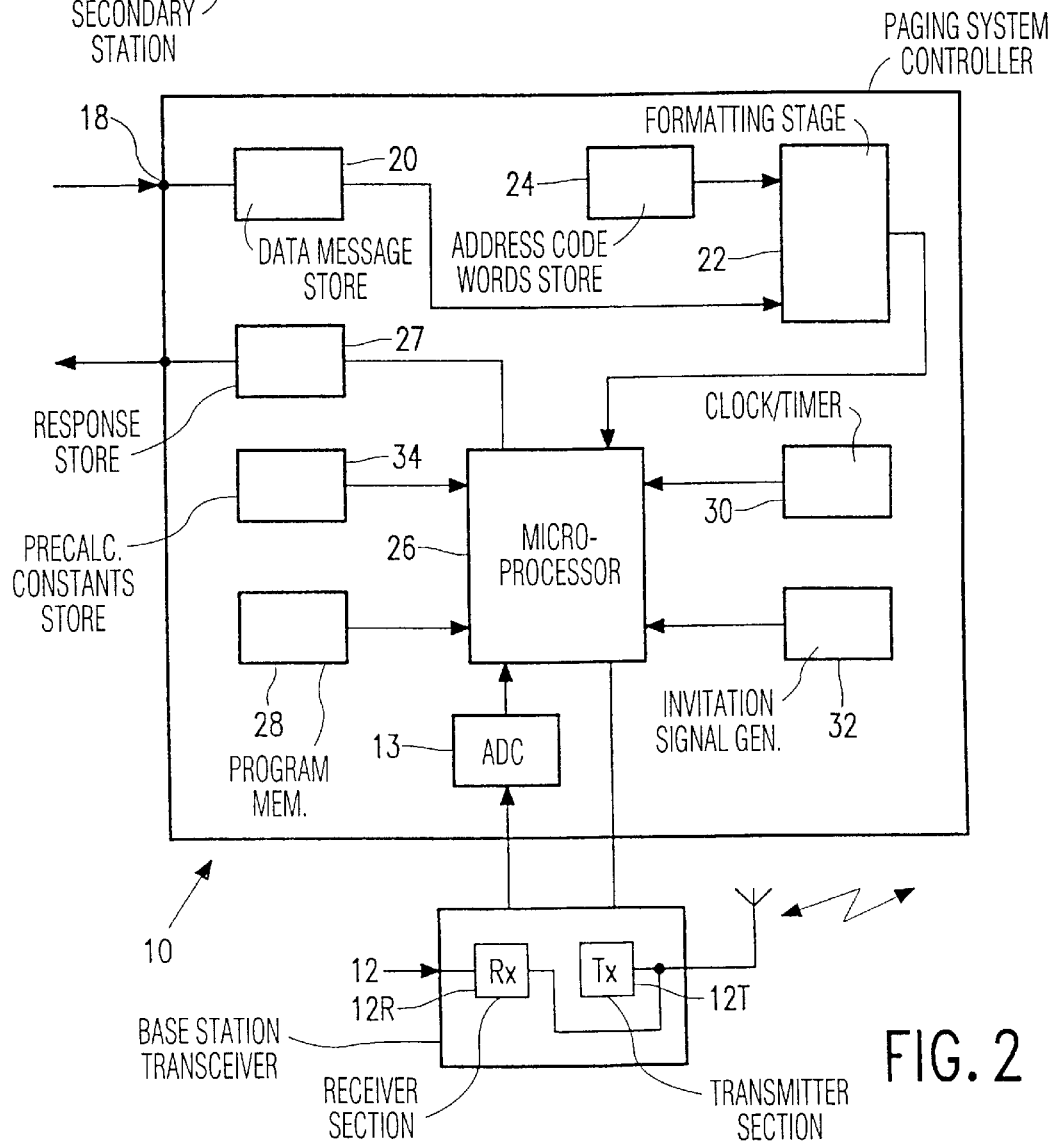
FIG. 2 is a block schematic diagram of a primary station comprising a system controller and a base station transceiver.

FIG. 2 shows an arrangement of a system controller 10 connected to the transceiver 12 which transmits data messages addressed to specified secondary stations. The system controller 10 comprises an input 18 for data messages to be relayed via a transmitter section 12T of the transceiver 12. The messages are held in a store 20 from where they are relayed to a formatting stage 22 which appends an address code word to the message and divides the message into a plurality of concatenated code words of a pre-determined length, each code word including error detection/correction bits and optionally an even parity bit. The address code words are held in a store 24. A microprocessor 26 is provided which controls the operation of the system controller in accordance with a program which is stored in a memory 28. Also connected to the microprocessor 26 are a clock/timer stage 30, an invitation signal generator 32 and a store 34 for storing precalculated constants to be used when decoding and detecting the response signals, as will be described later. Once the data messages in the store 20 have been formatted in the stage 22 the processor 26 causes them to be relayed by the transmitter section 12T. The formatting of the data messages may conform to any known message format such as APOC, CCIR Radiopaging Code No 1 (otherwise known as POCSAG) or to any other signal format which is known or yet to be devised. Once the messages have been transmitted, the processor arranges to transmit the invitation-to-respond signals generated in the stage 32.

The processor 26, following the transmission of an invitation signal, switches the transceiver 12 to receive and is ready to accept signals received by a receiving section 12R of the transceiver 12, the outbound propagation path to the or each secondary station being substantially the same as that of the inbound propagation path. In order to identify each of the responses which is sent as a pseudo-random code sequence, each of the code sequences is simultaneously despread and the response message detected as will be described later.

The output of the receiver section 12R is coupled to an analogue-to-digital converter (ADC) 13 having an output connected to the microprocessor 26. A response store 27 is coupled to the microprocessor 26 for storing the detected responses awaiting delivery by any suitable means, for example e-mail, to the intended recipient.

Figure 3:
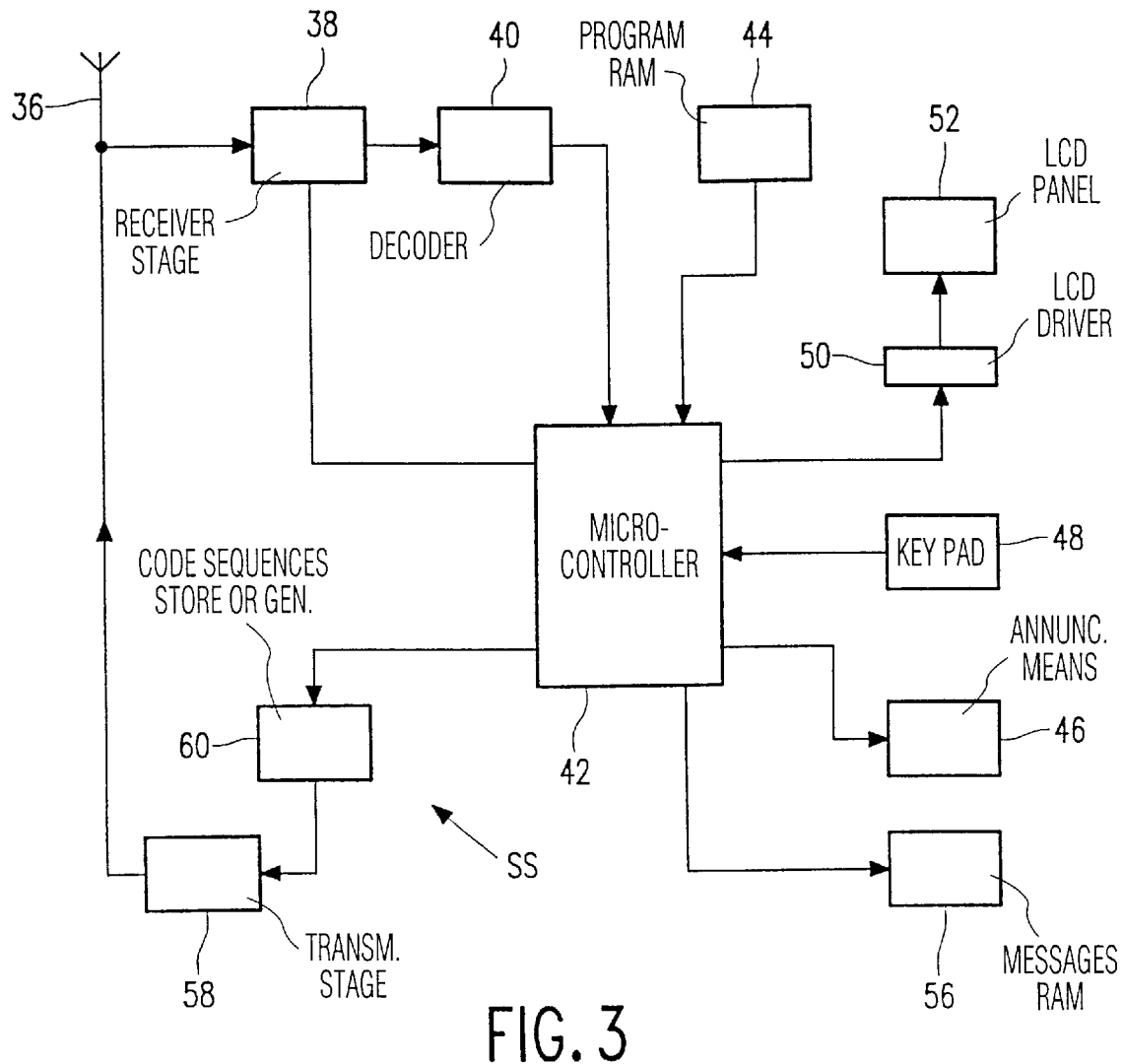
FIG. 3 is a block schematic diagram of a secondary station.

FIG. 3 is a block schematic diagram of a secondary station SS having the capability of transmitting responses to invitation signals as pseudo-random code sequences. The secondary station SS comprises an antenna 36 which is coupled to a receiver stage 38. An output of the receiver stage 38 is coupled to an input of a decoder 40. A microcontroller 42 is coupled to the output of the decoder 40 and controls the operation of the secondary station in accordance with a program held in a read only memory (ROM) 44. The microcontroller 42 has inputs/outputs, as appropriate, coupled to annunciating means 46 which may be audio, visual and/or tactile, a keypad 48, data output means, for example an LCD driver 50 which is coupled to an LCD panel 52, and a random access memory (RAM) 56 for storing any messages which have been received and decoded.

In operation the receiver stage 38 is energised in response to the particular battery economising protocol followed by the secondary station SS. Optionally the decoder 40 and the microcontroller 42 may "sleep" when not required, the microcontroller 42 being woken by an internal timer (not shown) or an interrupt signal and in so doing waking up other stages of the secondary station, as appropriate. When an address code word is received, it is demodulated, decoded, error corrected and checked to see if it is one assigned to the secondary station or an invitation to send a message to the primary station. Assuming it is an address code word assigned to the secondary station then depending on the programming of the microcontroller 42, the annunciating means 46 may be activated to inform the user that a call has been received. However a user by actuating a key or keys of the keypad 48 can inhibit one or more of the output devices of the annunciating means. If a short message at the same data rate as the address code word is concatenated with the paging call then once it has been decoded and error checked/corrected, the microcontroller 42 causes the decoded message to be stored in the RAM 56. By actuating a key or keys of the keypad 48, a user can instruct the microcontroller 42 to read-out the message from the RAM 56 to the LCD driver 50 which will cause the message to be displayed on the screen of LCD panel 52. The operation described so far is typical for many alphanumeric message pagers conforming to the POCSAG standard.

The illustrated secondary station SS includes a low power transmitter 58 whereby acknowledgements and/or short messages can be relayed to the or any in-range base station transceiver. The actual acknowledgement or message is generated by the microcontroller 42 and will be transmitted as a spread spectrum signal. One or more near orthogonal pseudo-random code sequences may be stored or generated in a stage 60. The microcontroller 42 controls the reading out of the selected or generated code sequence from the stage 60 which is coupled to a transmitter 58. The code sequence may be a time shifted version of a selected or generated sequence. The code sequence may represent the identity of the secondary station and/or the number of a message received and/or coded reply as shown below.

Code Sequence 1—secondary station in the area for the purposes of registration only.

Code Sequence 2—Received last message.

Code Sequence 3—Read message(s).

Code Sequence 4—Answer "Yes".

Code Sequence 5—Answer "No".

Code Sequence 6—Resend last message.

In a practical situation strings of messages are transmitted sequentially as point-to-point transmissions to different secondary stations and in those cases where answers are required, the number of possible answers may vary. Consequently the amount of computation at the system controller 10 (FIGS. 1 and 2) to decode and detect the received signals can be significant.

In accordance with the present invention, the digitised signals from the ADC 13 (FIG. 2) are processed in the microprocessor 26 to simultaneously decode and detect each of the pseudo-random code sequences and to assign an identification of the recipient before forwarding the response to the response store 27. Previously despreading and detection of pseudo-random code sequences has been achieved by two discrete operations, the first of the two operations being to despread the sequence and the second of the operations being to perform Fourier Transform analysis for detection. Carrying out these two discrete operations is computationally intensive. The present invention simplifies the process by despreading a sequence within the Fourier Transform (FT) to reduce the processing time.

Figure 4:
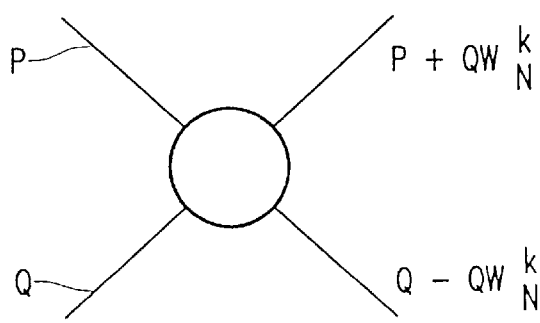
FIG. 4 is a diagram illustrating a "butterfly"

The Fourier Transform (FT) is an extremely powerful mathematical tool that may be used to analyse the frequency spectrum of a time domain signal and provide the basis for detection of a signal in the presence of other signals or noise. The theoretical implementation implies the analysis of a signal that continues infinitely in time. The microprocessor 26 records a representation of an analogue signal in the form of numerical time domain samples and thus the transform may be implemented as a Discrete Fourier Transform (DFT) of finite length. By exploiting the symmetry properties of the DFT it is possible to reduce the transform to a number of 2 point DFTs in order to minimise the quantity of computation undertaken by the computer. The minimal 2 point DFT operation is known as a "butterfly" and the complete transform implemented with "butterflies" is known as a Fast Fourier Transform (FFT). The FFT is therefore a mathematical implementation of the DFT comprising a collection of 2 point DFTs. The detection of individual pseudo-random code sequences in a plurality of code sequences potentially requires a vast number of FFTs to be performed which can be reduced by an efficient implementation of the despreading and detection process. FIG. 4 shows a simplified Radix 2, Decimation in Time (DIT) FFT butterfly, where P and Q are the input variables and $W^k_N$ is a constant sometimes known as a "twiddle factor".

Each butterfly consists of multiplication and data relocation operations. The twiddle factors (or constants) for the multiplication process are precalculated and held in a look-up table.

Figure 5:
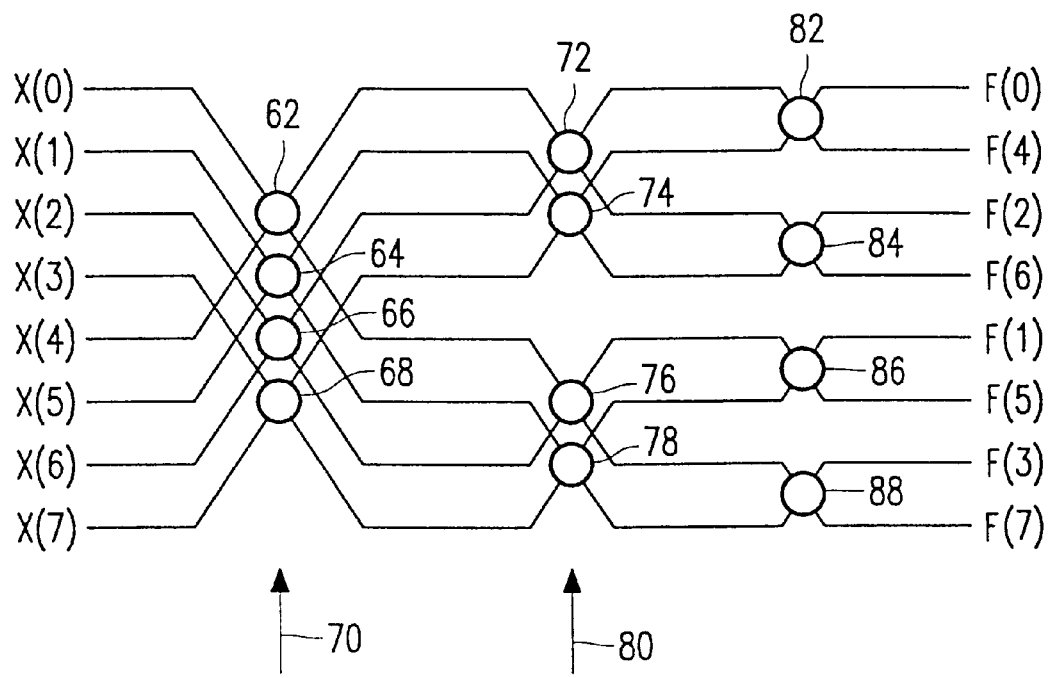
FIG. 5 is a diagram illustrating an implementation of a Fast Fourier Transform (FFT)

A part of the implementation of the 2 points DFT (butterfly) involves multiplication of the data by a constant (or twiddle factor) which is derived from a trigonometrical function (Sine or Cosine). These constants are dependant upon the overall length of the FFT. For speed, these constants are often precalculated and stored in the store 34 coupled to or forming a part of the microprocessor 26. Referring to FIG. 5 which shows an implementation of an 8 point FFT, the despread code is combined with the precalculated constants for the first series of 2 point DFTs within the FFT thereby reducing the computational intensity of the despread and detection algorithm. Additionally, a window or a scaling function may be included within the precalculated constants to further increase the functionality of the algorithm without additional computation. The despread/FFT operation may be implemented using a higher order radix butterfly (e.g 4 or 8) to improve processing speed. The choice of radix will depend upon the length of the FFT.

The FFT implementation shown in FIG. 5 comprises a first set of 4 multipliers 62, 64, 66 and 68 in which pairs of input variables comprising real values X(0), X(4); X(1), X(5); X(2), X(6) and X(3), X(7), respectively, are applied together with a despread code combined with twiddle factors as indicated by the arrow 70. More particularly the variables X(0) to X(7) comprise a digital representation of the received analogue pseudo-random code sequence and the despread code is the chip sequence which is a computer generated code or a code read out from a memory. Another set of multipliers 72, 74, 76 and 78 are provided having pairs of inputs connected to one or other of two outputs of the multipliers 62, 66; 64, 68; 62, 66 and 64, 68, respectively. Ordinary twiddle factors are applied to these multipliers as indicated by the arrow 80. A further set of multipliers 82, 84, 86 and 88 are provided having pairs of inputs connected to one or other of two outputs of the multipliers 72, 74; 72, 74; 76, 78 and 76, 78, respectively. Outputs of the multipliers 82, 84, 86 and 88 respectively comprise real numbers F(0), F(4), F(2), F(6), F(1), F(5), F(3) and F(7).

Figure 6:
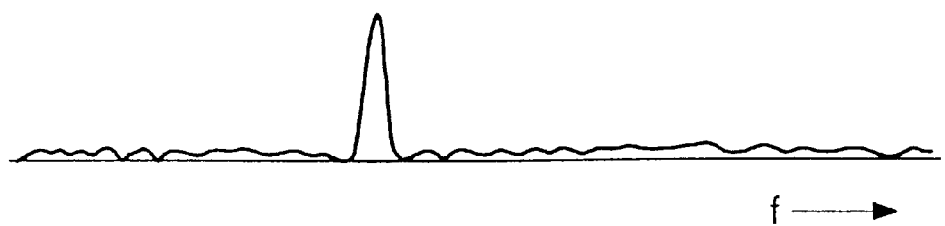
FIG. 6 is a frequency (f) versus amplitude graph illustrating the output of the FFT when an input signal has been despread.

FIG. 6 illustrates the output of the FFT comprising a spectrum formed by the real numbers representing a signal which has been successfully despread. A peak occurs at the frequency of the signal. As the microprocessor 26 knows which despread code it generated or selected, it can determine the nature of the answer and the originator of the message being responded to and can relay the answer to the originator.

For the sake of completeness, if a signal has not been despread successfully then the spectrum will represent noise and not have a discernible peak.

From reading the present disclosure, other modifications will be apparent to persons skilled in the art. Such modifications may involve other features which are already known in the design, manufacture and use of communications systems and component parts thereof and which may be used instead of or in addition to features already described herein.

What is claimed is:

1. A communications system comprising a primary station having transmitting and receiving means, means for formatting messages to be transmitted by the transmitting means, and one or more secondary stations, each secondary station having receiving means for receiving messages from the primary station and means for transmitting signals as pseudo-random code sequences, said receiving means in the primary station being adapted to receive and to simultaneously decode and detect the received pseudo-random code sequences by implementing a Fast Fourier Transform (FFT) in a manner that a pre-defined code sequence for despreading the received pseudo-random code sequence is applied within the FFT.

2. A communications systems as claimed in claim 1, wherein the FFT is implemented as a sequence of sets of multiplication operations alternating with sets of data re-location operations, and the predefined code sequence is applied in at least one of the sets of multiplication operations.

3. A communications system as claimed in claim 2, wherein coefficients for the multiplication operations are held in a look-up table.

4. A primary station for use in a communications system comprising at least said primary station and at least one secondary station having means for transmitting signals as pseudo-random code sequences, the primary station comprising transmitting and receiving means, means for formatting messages to be transmitted by the transmitting means, said receiving means being adapted to receive and to simultaneously decode and detect received pseudo-random code sequences by implementing a Fast Fourier Transform (FFT) in a manner that a pre-defined code sequence for despreading the received pseudo-random code sequence is applied within the FFT.

5. A primary station as claimed in claim 4, wherein the FFT is implemented as a sequence of sets of multiplication operations alternating with sets of data re-location operations, and the predefined code sequence is applied in at least one of the sets of multiplication operations.

6. A primary station as claimed in claim 5, wherein coefficients for the multiplication operations are held in a look-up table.

7. A method of distinguishing between each of a plurality of substantially simultaneously occurring different pseudo-random code sequence signals, comprising simultaneously decoding and detecting the received pseudo-random code sequences by implementing a Fast Fourier Transform (FFT) in a manner that a pre-defined code sequence for despreading the received pseudo-random code sequence is applied within the FFT.

8. A method as claimed in claim 7, wherein the FFT is implemented as a sequence of sets of multiplication operations alternating with sets of data re-location operations, and the predefined code sequence is applied in at least one of the sets of multiplication operations.

9. A communication system as claimed in claim 1, wherein the receiving means in the primary station is further adapted to check for a peak in a spectrum derived from outputs of the FFT.

10. A communication system as claimed in claim 4, wherein the receiving means in the primary station is further adapted to check for a peak in a spectrum derived from outputs of the FFT.

11. A method as claimed in claim 7, further comprising checking for a peak in a spectrum derived from outputs of the FFT.

* * * * *